United States Patent [19]

Saito

[11] 4,429,377

[45] Jan. 31, 1984

[54] ROTARY RECORDING MEDIUM REPRODUCING APPARATUS HAVING A JACKET OPENING ENLARGING DEVICE

[75] Inventor: Takashi Saito, Ayase, Japan

[73] Assignee: Victor Company of Japan, Ltd., Yokohama, Japan

[21] Appl. No.: 384,690

[22] Filed: Jun. 3, 1982

[30] Foreign Application Priority Data

Jun. 12, 1981 [JP] Japan .................................. 56-90321

[51] Int. Cl.³ ........................ G11B 23/04; G11B 19/00
[52] U.S. Cl. .................................................... 369/77.2
[58] Field of Search ........................................ 369/77.2

[56] References Cited

FOREIGN PATENT DOCUMENTS

| | | | |
|---|---|---|---|
| 2489029 | 2/1982 | France | 369/77.2 |
| 2489998 | 3/1982 | France | 369/77.2 |
| 2071391 | 9/1981 | United Kingdom | 369/77.2 |
| 2073471 | 10/1981 | United Kingdom | 369/77.2 |
| 2085640 | 4/1982 | United Kingdom | 369/77.2 |
| 2086123 | 5/1982 | United Kingdom | 369/77.2 |

Primary Examiner—Steven L. Stephan
Attorney, Agent, or Firm—Ladas & Parry

[57] ABSTRACT

A reproducing apparatus reproduces a rotary recording medium accommodated within a case. The case comprises a jacket having a space for accommodating the rotary recording medium therein and an opening through which the rotary recording medium can enter and leave the jacket, and a lid member inserted through the opening of the jacket for covering and closing the opening. The reproducing apparatus comprises an inserting opening through which the case is inserted, clamping mechanism disposed in at an innermost part of the reproducing apparatus, for clamping the rotary recording medium when the case is inserted into the reproducing apparatus and then the jacket is pulled out of the reproducing apparatus to leave the rotary recording medium within the reproducing apparatus, a jacket opening enlarging device provided in the vicinity of the inserting opening, and movable between a position in the vicinity of the inserting opening and said innermost part of the reproducing apparatus by passing over a turntable, for enlarging the jacket opening upwards and downwards so as to mutually separate an upper plate and a lower plate of the jacket inserted into the reproducing apparatus through the inserting opening upwards and downwards, and a jacket opening enlargement limiting mechanism provided to oppose parts in the vicinity of the right and left ends of the jacket inserted into the reproducing apparatus through the inserting opening, for receiving the upper and lower plates mutually separated upwards and downwards by the jacket opening enlarging device and limiting the displacement in the upward and downward directions. The jacket opening is enlarged in a state where the enlargement is limited at the parts in the vicinity of the right and left ends thereof.

6 Claims, 11 Drawing Figures

ROTARY RECORDING MEDIUM REPRODUCING APPARATUS HAVING A JACKET OPENING ENLARGING DEVICE

BACKGROUND OF THE INVENTION

The present invention generally relates to rotary recording medium reproducing apparatuses capable of placing and leaving a rotary information recording medium in a state possible for reproduction within the reproducing apparatus when a jacket having a lid for accommodating the recording medium therein is inserted into and then pulled out from within the reproducing apparatus, and also capable of incasing the recording medium within the jacket so that the recording medium can be obtained outside the reproducing apparatus together with the jacket, when the empty jacket is inserted into and then pulled out from within the reproducing apparatus. The present invention relates more particularly to a rotary recording medium reproducing apparatus having a jacket opening enlarging device for enlarging an opening of the jacket in a state where the enlargement is limited at the right and left ends of the jacket, when the jacket is inserted into the reproducing apparatus.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc jacket (disc case) which has a lid and accommodates a disc therein, from within the reproducing apparatus. As a conventional apparatus of this type, in a U.S. patent application Ser. No. 231,868 filed Feb. 5, 1981, entitled "DISC-SHAPED RECORDING MEDIUM REPRODUCING APPARATUS" in which the assignee is the same as that of the present application, a reproducing apparatus was proposed which cooperates with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, clamping means for clamping at least one of the disc and the lid member provided at an innermost part on the opposite side from the inserting opening with respect to the turntable, jacket opening enlarging device provided in the vicinity of the inserting opening, capable of moving over the turntable between the position in the vicinity of said inserting opening and the innermost part of said reproducing apparatus, for enlarging the opening of the jacket by entering inside said cutouts of said lid member, upon insertion of the jacket into the reproducing apparatus through the inserting opening, lowering and raising means for lowering the disc to a position where the disc is placed on the turntable from a clamped position where the disc is clamped by the clamping means upon starting of the reproduction and raising the disc to the clamping position from the turntable upon finishing or discontinuing of the reproduction, a reproducing transducer for reproducing the disc placed on the turntable, and moving means for moving the reproducing transducer from a waiting position to a reproducing position with respect to the disc.

In the above reproducing apparatus, the opening of the jacket is enlarged by the jacket opening enlarging device, when two parts at the right and left sides equidistant from the center part of the jacket opening are held by enlarging fingers and then spread upwards and downwards. Hence the jacket opening is enlarged in a substantially uniform manner between the right and left enlarging fingers. Although the extent to which the jacket opening is enlarged gradually becomes small towards the outer sides of these enlarging fingers, the jacket opening is enlarged to the right and left ends thereof. According to the shape, material, and molding method of the jacket, the jacket opening may be greatly enlarged to the right and left ends thereof. In such a case, a gap will be formed between the disc and the jacket opening, along the thickness direction of the disc. Because of this gap, the disc becomes movable upwards and downwards within the jacket opening. As will be described hereinafter, this will cause damage to the disc.

When the jacket is pulled out of the reproducing apparatus, a lifter of the lowering and raising means rises to support the center part of the disc. Because this lifter is raised in accordance with the operation in which the jacket is pulled out, the lifter will rise rapidly to hit against the disc if the jacket is pulled out in a quick manner. In such a case, the disc may bounce upwards and downwards above the filter. If the jacket opening is greatly enlarged to the right and left ends thereof, this bouncing of the disc within the jacket opening will be large. Therefore, there was a disadvantage in that the recording surface of the disc will be hit by the enlarging fingers unnecessarily, and become damaged.

SUMMARY OF THE INVENTION

Accordingly, it is a general object of the present invention to provide a novel and useful rotary recording medium reproducing apparatus having a jacket opening enlarging device, in which the above described disadvantages have been overcome.

Another and more specific object of the present invention is to provide a rotary recording medium reproducing apparatus having a jacket opening enlarging device constructed to enlarge a jacket opening in a state where the enlargement is limited at positions in the vicinity of the right and left ends of the jacket opening. According to the apparatus of the present invention, it is possible to prevent bouncing of a rotary recording medium which may occur when the jacket is pulled out in a fast manner, to prevent the rotary recording medium from being damaged.

Further objects and features of the present invention will be apparent from the following detailed description when read in conjunction with the accompanying drawings.

DETAILED DESCRIPTION

Figure 1:
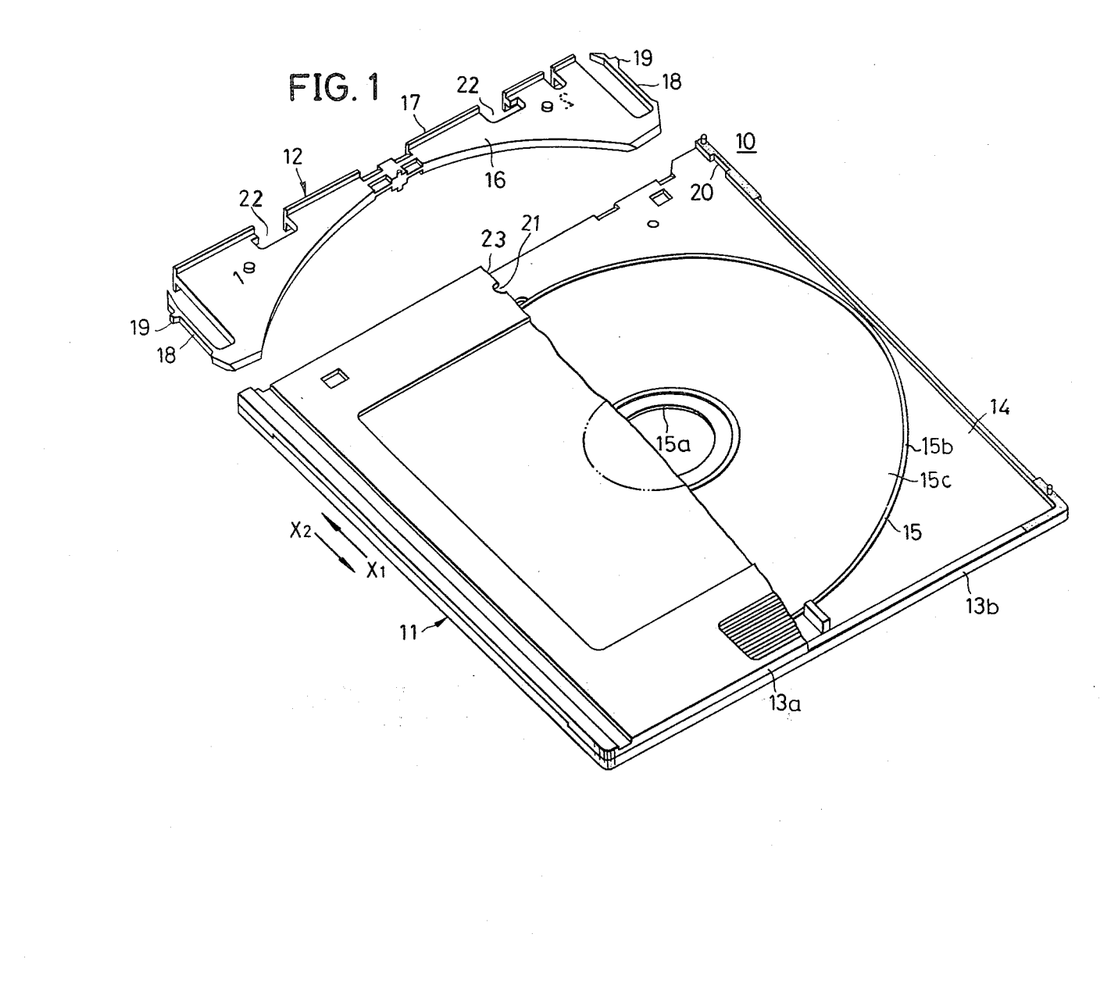
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13 and 13, and comprises a flat cavity or space 14 therein. This space 14 is open at an opening 23 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
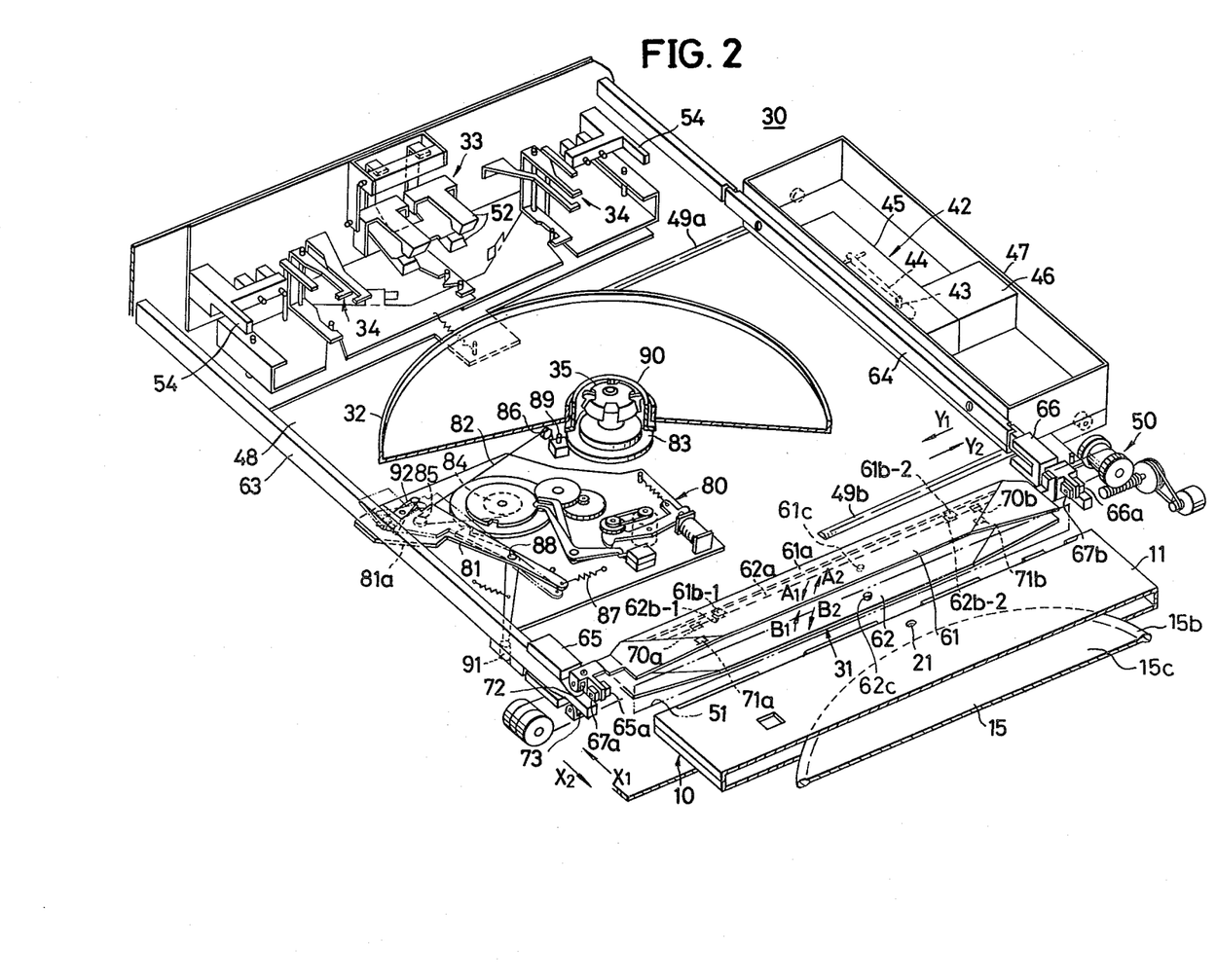
FIG. 2 is a perspective view, with a part cut away, showing the inner construction of a rotary recording medium reproducing apparatus according to the present invention.

As shown in FIG. 2, a reproducing apparatus 30 substantially comprises a jacket opening enlarging device 31 which constitutes an essential part of the present invention, a turntable 32 to rotate the disc 15 positioned thereon, a disc clamping mechanism 33 for clamping the disc 15, a lid plate locking mechanism 34 for locking the lid plate 12, and the like. The construction and operation of the jacket opening enlarging device 31 will be described below.

A reproducing transducer 42 comprises a pickup device 45 including a cantilever 44 provided with a reproducing stylus 43, a resonator 46 and the like, and is mounted to a carriage 47. The carriage 47 is transferred in the directions of arrows Y1 and Y2 by means of a transferring mechanism 50, in a state where rollers provided on the carriage 47 roll along rails 49a and 49b respectively provided on a chassis 48.

The disc clamping mechanism 33 is provided at the inner part of the reproducing apparatus 30 on the opposite side of an inserting opening 51, and comprises a pair of upper and lower holding fingers 52.

A disc lifter mechanism 80 comprises a lifter lever 81, a wire 82, an elevator 83, and the like. The wire 82 is fed out by a reel 84 and is connected to the elevator 83, through guidance provided by a pulley 85 on the lifter lever 81 and a separately provided pulley 86. In a state before the disc case 10 is inserted into the reproducing apparatus 30, the lifter lever 81 is angularly rotated counterclockwise about a pin 88 by a spring 87, as shown in FIG. 2. The elevator 83 is pulled upwards by the wire 82, and is raised along a guide beam 89. In this state, a disc lifter 90 is supported by the elevator 83, and is in a raised position indicated by a two-dot chain line in FIG. 3. In addition, a cam part 81a of the lifter lever 81 enters within a moving path of a pin member 91, at the lower side of a slider 65.

Upon reproduction of the disc 15, the disc case 10 is inserted through the inserting opening 51 of the reproducing apparatus 30, by inserting the disc case 10 with the side of the lid plate 12 into the direction of an arrow X1.

When the disc case 10 is inserted into the reproducing apparatus 30 in the above described state, the jacket opening enlarging device 31 is pushed and moved in the direction of the arrow X1 by the disc case 10. As the enlarging device 31 moves, the front part of the upper and lower jacket halves 13 are enlarged upwards and downwards, to enlarge the opening 23, as will be described below.

When the jacket opening enlarging device 31 moves to a halfway position, the cam part 81a of the lifter lever 81 is pushed by the pin member 91. Hence, the lifter lever 81 is angularly rotated clockwise against the force exerted by the spring 87 as indicated by a two-dot chain line in FIG. 2, and is locked in this position by a locking lever 92. The tension in the wire 82 decreases when the lifter lever 81 angularly rotates in the manner described above, and the disc lifter 90 moves downwards due to its own weight together with the elevator 83, and recedes from the disc case insertion path.

When the disc case 10 is inserted into the innermost part of the reproducing apparatus 30 together with the enlarging device 31 through the upper side of the turntable 32 and the disc lifter 90, cutouts 22 of the lid plate 12 is locked by the lid plate locking mechanism 34. Hence, the lid plate 12 is locked and held at the innermost part of the reproducing apparatus 30.

Furthermore, engagement releasing members 54 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 52.

Next, the jacket 11 is pulled out in the direction of an arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. As the jacket 11 is pulled out to a halfway position, the locking lever 92 is pushed and angularly rotated by the pin member 91. Thus, locking with respect to the lifter lever 81 is released, and the lifter lever 81 is angularly rotated counterclockwise by the spring 87. The wire 82 is pulled to raise the elevator 83, by the above angular rotation of the lifter lever 81. Moreover, the disc lifter 90 is pushed upwards by the elevator 83, to support the center part of the disc 15. In a state where the jacket 11 is completely pulled out of the reproducing apparatus 30, the disc 15 is supported horizontally, at a position directly above the turntable 32.

When a play operation is then performed, an elevator motor (not shown) is started, to angularly rotate a reel-cam-gear structure 93 clockwise. The reel-cam-gear structure 93 is stopped after being angularly rotated by a predetermined angle. First, by the angular rotation of the reel-cam-gear structure 93, the wire 82 is fed out from the reel 84 to lower the disc lifter 90. Secondly, the clamping with respect to the disc 15 by the disc clamping mechanism 33 is released. Accordingly, the disc 15 is lowered and placed onto the turntable 32. The disc 15 is held by a disc holding mechanism 35 at a center hole 15a thereof. The disc 15 is rotated clockwise together with the turntable 32, by a motor 36.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of a reproducing operation, the elevator motor (not shown) is started, to angularly rotates the reel-cam-gear structure 93 counterclockwise. Thus, the disc 15 is pushed upwards by the disc lifter 90, and the raised disc 15 is held by the clamping mechanism 33.

Upon recovering of the disc 15, an empty jacket 11 is again inserted into the reproducing apparatus 30 through the inserting opening 51, with the opening of the jacket 11 first. Thus, the enlarging device 31 is pushed by the jacket 11 and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11. When the jacket 11 is inserted into the final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10. During this disc recovering operation, the disc lifter mechanism 80 operates in a manner similar to that upon loading of the disc described above.

In the above disc lifter mechanism 80, the disc lifter 90 is raised at a speed according to the speed with which the lifter lever 81 is angularly rotated counterclockwise.

During the above described loading of the disc, the cam part 81a of the lifter lever 81 makes contact with the pin member 91 which moves in the direction of the arrow X2, and the lifter lever 81 angularly rotates at a relatively low speed when the jacket 11 is pulled out in normal manner, that is, with a normal speed. Hence, in this case, the disc lifter 90 is raised gradually, and the disc 15 is supported without applying much shock to the disc 15. However, if the jacket 11 is pulled out in an exceedingly fast manner, the pin member 91 will pass by the cam part 81a before the cam part 81a can follow. Thus, in this case, the lifter lever 81 will be angularly rotated counterclockwise in a rapid manner and returned by the spring force of the spring 87 without being guided by the pin member 91, when the locking of the lifter lever 81 is released. Accordingly, the disc lifter 90 will also be raised rapidly, to hit against the disc 15. This causes bouncing of the disc 15 towards the upper and lower directions. In the present invention, the shape of the jacket opening in the enlarged state is suitably determined, to limit the bouncing phenomenon of the disc 15 and prevent the disc surface from being damaged due to this bouncing phenomenon.

Figure 3:
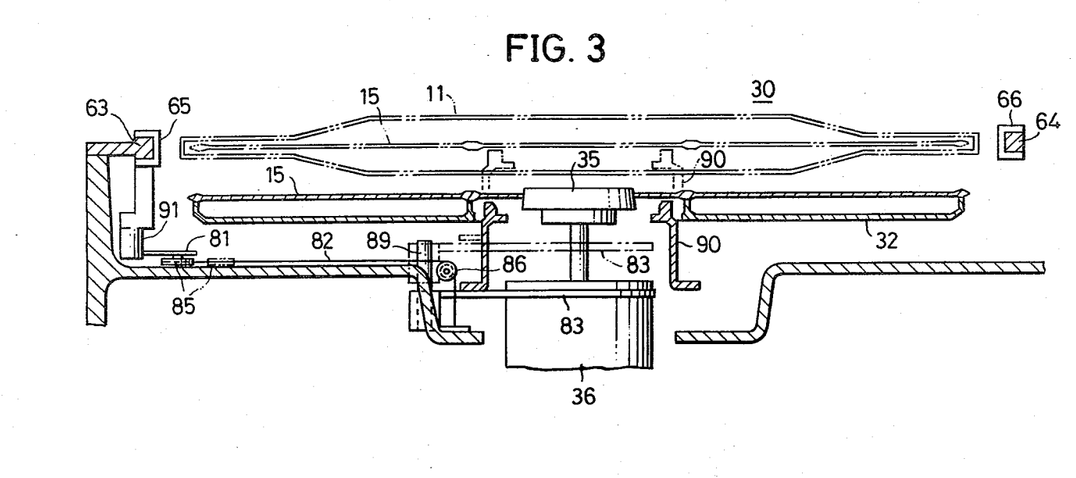
FIG. 3 is a front view showing a general cross section of the apparatus shown in FIG. 2.

Next, an embodiment of a jacket opening enlarging device constituting an essential part of reproducing apparatus of the present invention will be described with reference to FIGS. 4, 5A, 5B, 6A, 6B, 7, and 8. In these figures, those constituent parts which are the same as corresponding parts shown in FIGS. 1 through 3 are designated by the same reference numerals and will not be described again in detail.

Figure 4:
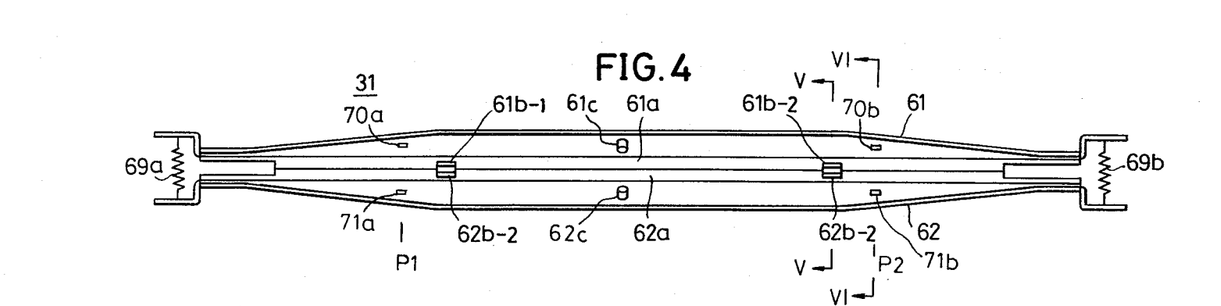
FIG. 4 is a front view showing an embodiment of a jacket opening enlarging device constituting an essential part of the reproducing apparatus according to the present invention.

As shown in FIG. 4, the jacket opening enlarging device 31 is constituted, essentially, by elongated upper and lower enlarging members 61 and 62 extending in the arrow directions Y1 and Y2, and sliders 65 and 66 fitted on guide rails 63 and 64 and supporting the opposite ends of the enlarging members 61 and 62. In accordance with the insertion and extraction of the disc case 10, this jacket opening enlarging device 31 moves in the directions of the arrows X1 and X2 under the guidance provided by the guide rails 63 and 64, and passes between a position in the vicinity of the inserting opening 51 and the innermost part of the reproducing apparatus 30, over the turntable 32.

The upper enlarging member 61 is rotatably supported to pivot in the directions of arrows A1 and A2, in a state where trunnions 67a and 67b at its left and right ends are respectively journaled in bearing parts 65a and 66a on the upper sides of the sliders 65 and 66. The lower enlarging finger 62 is also rotatably supported in a similar manner to pivot in the directions of arrows B1 and B2, in a state where its trunnions 68a and 68b (only one shown) are journaled in the bearings (not shown) on the lower side of the sliders 65 and 66. The trunnions 67a, 67b, 68a, and 68b are respectively disposed in the enlarging members 61 and 62 at the lateral edges in the direction of the arrow X2. As shown in FIG. 4, tension coil springs 69a and 69b are stretched between the ends of the upper and lower enlarging members 61 and 62, to urge these members towards their closing directions indicated by the arrows A1 and B1.

Figure 5A:
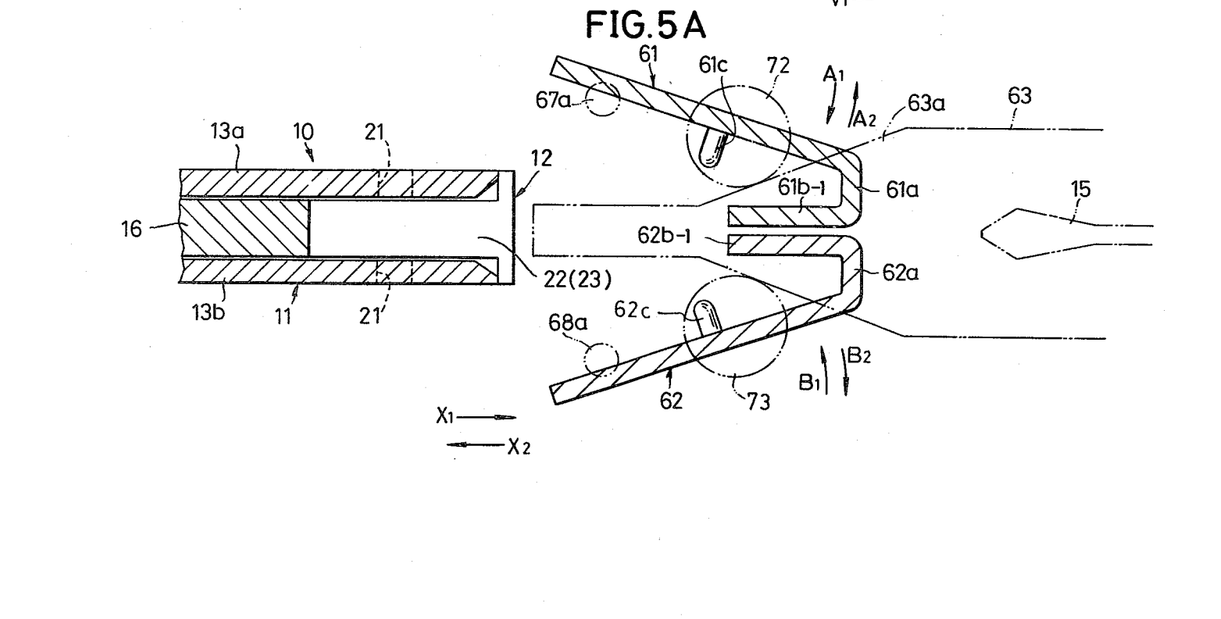
FIG. 5A is an elevation in cross section along a line V—V in FIG. 4, showing the construction of a part of enlarging fingers in a jacket opening enlarging device together with a disc case in an enlarged scale.
Figure 5B:
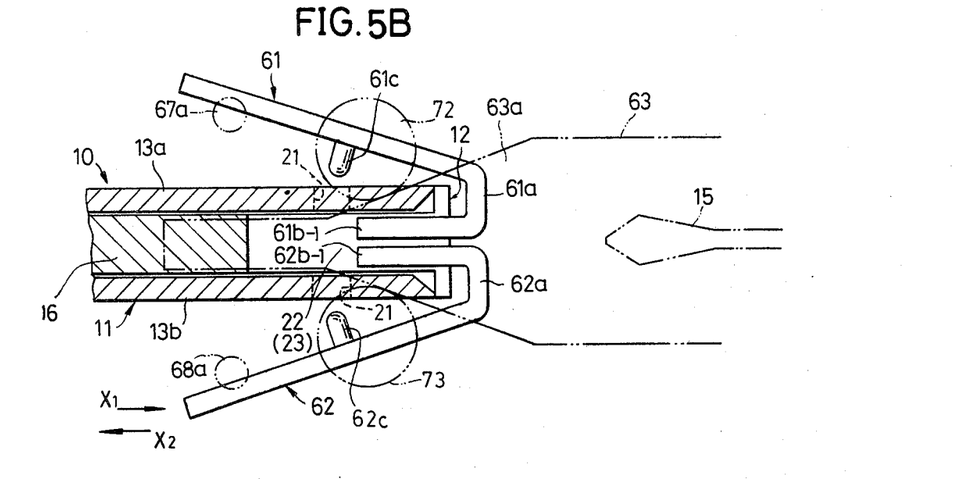
FIGS. 5B and 5C are diagrams respectively showing operational states of a jacket opening enlarging device, in which a jacket opening is enlarged upon insertion of a disc case.

Furthermore, as shown in particular in FIG. 5A, a downwardly bent part 61a is formed at the edge opposite that of the trunnions 67a and 67b, in the upper enlarging member 61. Two enlarging fingers 61b-1 and 61b-2 are formed by bending at two positions of this downwardly bent part 61a. These enlarging fingers 61b-1 and 61b-2 extend toward the inserting opening 51 (direction of the arrow X2) at positions confronting the two cutouts 22 of the lid plate 12 of the inserted disc case 10. Similarly, the lower enlarging member 62 is also formed to have a bent part 62a and enlarging fingers 62b-1 and 62b-2. The two sets of enlarging fingers 61b-1 and 62b-1, and 61b-2 and 62b-2 confronting in the upward and downward directions mutually cooperate to carry out a case enlarging operation as described hereinafter. Further, lugs 61c and 62c which enter within circular windows 21 in the upper and lower jacket halves 13a and 13b of the enlarged jacket 11, are provided at the center part of the upper and lower enlarging members 61 and 62.

Figure 6A:
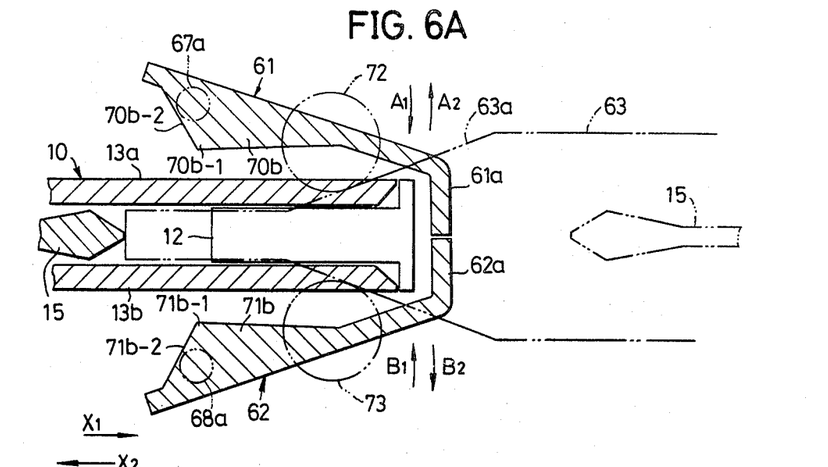
FIG. 6A is an elevation in cross section along a line VI—VI in FIG. 4, showing the construction of a part of enlargement limiting projections in a jacket opening enlarging device together with a disc case in an enlarged scale.

As shown in FIGS. 4 and 6A, enlargement limiting projections 70a and 71a, and 70b and 71b which constitute an essential part of the present invention, are respectively provided on the upper and lower enlarging members 61 and 62 opposing each other, at positions on the outer sides of the enlarging fingers 61b-1 and 62b-1, and 61b-2 and 62b-2. These projections 70a, 70b, 71a, and 71b are arranged so as to make contact with the jacket halves 13a and 13b upon enlargement of the jacket, and limit the enlargement of the opening 23.

Figure 7:
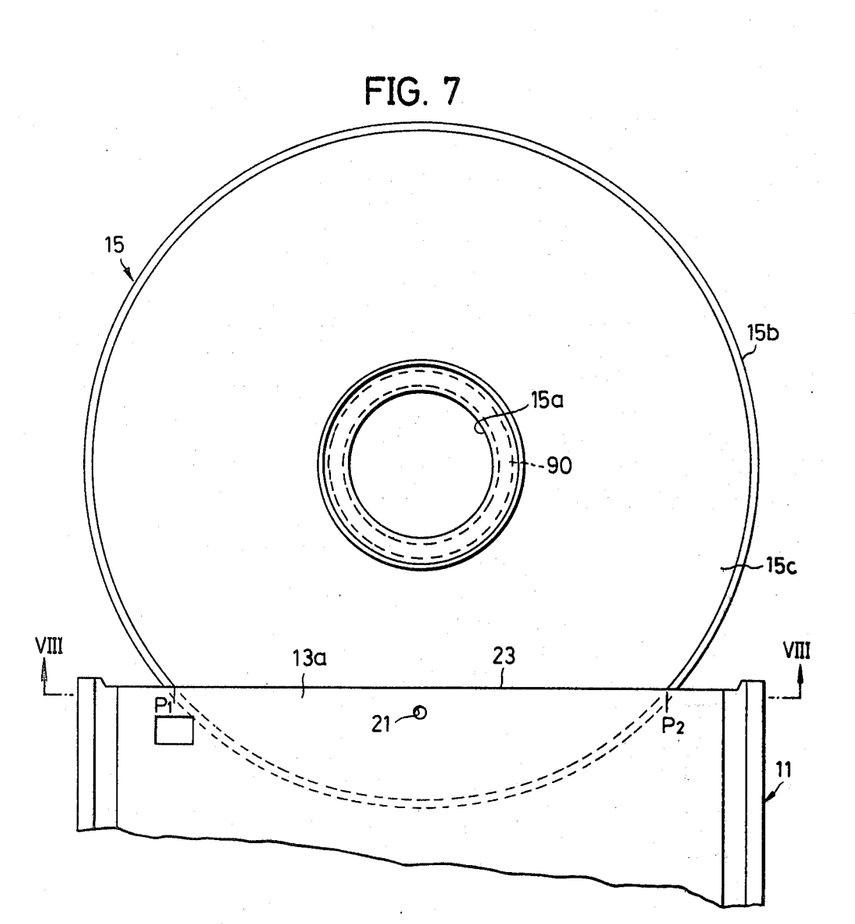
FIG. 7 shows positional relationships between a disc and a jacket pulled halfway out, in a state where a disc lifter rises to support the disc.

FIG. 7 shows the positional relationship between the jacket 11 which is partially extracted and the disc 15 which is left within the reproducing apparatus, in a state where the disc lifter 90 rises to support the disc 15 upon loading of the disc (this state will be referred to as a disc supporting state from hereinafter). The mutually opposing projections 70a and 71a, and 70b and 71b which form pairs, are respectively arranged at positions P1 and P2 opposing an outer groove guard 15b of the disc 15 at the opening 23 in the disc support state. If observed with respect to the directions of the arrows X1 and X2, the above projections 70a and 71a, and 70b and 71b are provided on the sides of the trunnions 67a and 67b in the upper and lower enlargement members 61 and 62, as shown in FIG. 6A. Thus, even when the enlarging members 61 and 62 perform the enlarging operation, the height position of these enlarging members 61 and 62 does not change greatly and is maintained at the original height position. In addition, the projections 70b (70a) and 71b (70b) are respectively formed unitarily with the upper and lower enlarging members 61 and 62, and have triangular cross section. Vertex parts 70b-1 and 71b-1 of these projections 70b and 71b receive the jacket halves 13a and 13b, to limit the displacement of these jacket halves 13a and 13b in the enlarging direction. Furthermore, sloping surfaces 70b-2 and 71b-2 sloping in the direction of the arrow X1, are provided on the projections 70b and 71b. These sloping surfaces 70b-2 and 71b-2 are provided to prevent the insertion of the disc case 10 (jacket 11) from being restricted, even when the disc case 10 (jacket 11) is inserted into the enlarging device 31 in a state deviated upwards or downwards from the center of the inserting opening 51 and makes contact with these surfaces 70b-2 and 71b-2. Accordingly, the disc case 10 (jacket 11) can be positively inserted into the innermost part of the enlarging device 31.

In addition, the upper and lower enlarging members 61 and 62 are provided with rollers 72 and 73 (left-hand rollers not shown) for rolling on the guide rails 63 and 64 to cause the enlarging members to separate in the upward and downward directions.

When the jacket opening enlarging device 31 is positioned on the side of the inserting opening 51 as shown in FIG. 2, the rollers 72 and 73 are at the narrow parts of tapered parts 63a on the front sides of the guide rails 63 (64). At this time, the upper enlarging member 61 has been rotated in the direction of the arrow A1 by the force of the tension coil springs 69a and is in a downwardly declining state. The lower enlarging member 62 at this time has been rotated in the direction of the arrow B1 and is in an upwardly inclining state. For this reason, the bent parts 61a and 62a at the free edges of the upper and lower enlarging members 61 and 62 are in pressing contact, thereby closing the inserting opening 51 as will be understood from FIGS. 2, 4, and 5A. Thus, the upper and lower enlarging members 61 and 62 have the function of closing the inserting opening 51, whereby a gate exclusively for closing this inserting opening becomes unnecessary. Thus, the construction of the inserting opening part becomes simple.

In the above described state, moreover, the enlarging fingers 61b-1, 61b-2, 61b-1 and 62b-2 are in mutually close positions which are at the height position of the center of the case inserting opening 51.

The jacket opening enlarging device 30 of the above described construction operates as follows.

The disc case 10 is inserted at the height position indicated in FIG. 5A in the direction of the arrow X1 into the reproducing apparatus 30. When the disc case 10 is thus inserted, the disc case 10 is guided by the sloping surfaces 70b-2 and 71b-2 even upon contact with the projections 70a, 70b, 71a, and 71b, and enters into the innermost part of the enlarging device 31. The case 10 and the enlarging device 31 assume the state indicated in FIG. 5B. More specifically, the enlarging fingers 61b-1, 62b-1 (61b-2, 62b-2) enter into the cutouts 22 of the lid plate 12 and advance relatively into the opening 23 of the jacket 11. The circular windows 21 of the jacket 11 are then positioned immediately below or above the lugs 61c-1 and 61c-2. As a consequence of the succeeding insertion of the case, the enlarging device 31 is pushed and moves in the direction of the arrow X1.

Figure 5C:
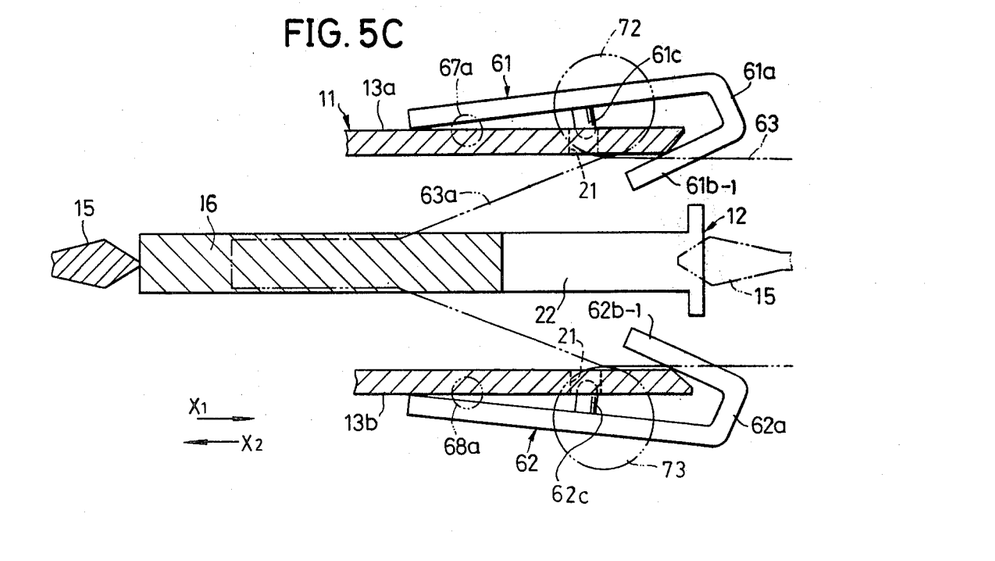

This movement of the enlarging device 31 causes the rollers 72 and 73 to roll up the tapered part 63a, as indicated in FIG. 5C and the upper and lower enlarging members 61 and 62 to rotate in the directions of the arrows A2 and B2 counter to the force of the springs 69a and 69b, so that the free or distal ends of the enlarging members separate. Consequently, the enlarging fingers 61b-1 (61b-2) and 62b-1 (62b-2) are displaced in mutually separating upward and downward directions. At this time, the enlarging finger 61b-1 (61b-2) engages with the upper jacket half 13a and pulls it upward, while the enlarging finger 62b-1 (62b-2) engages with the lower jacket half 13b to pull it downward. The jacket opening 23 is thus enlarged upward and downward.

The disc case 10 is thereafter inserted in this opening enlarged state in the direction of the arrow X1. Further, only the jacket 11 is drawn out in the direction of the arrow X2.

When the jacket 11 assumes the opening enlarged state, the circular windows 21 of the upper and lower jacket halves 13a and 13b onto the lugs 61c and 62c of the upper and lower enlarging members 61 and 62. As a result, when pulling out the disc case 10, the enlarging device 31 is drawn back together with the jacket 11 in the direction of the arrow X2 with the edges of the circular windows 21 in an engaged state with the lugs 61c and 62c.

When the enlarging device 31 is drawn back to the vicinity of the inserting opening 51, the rollers 72 and 73 are on the tapered part 63a of the guide rail 63, and the upper and lower enlarging members 61 and 62 respectively rotate in the directions of the arrows A1 and B1. Consequently, the enlarging device 31 assumes the state indicated in FIG. 5A. Hence, the opening of the jacket 11 becomes closed, and the edges of the circular windows 21 disengage from the lugs 61c and 62c. Thus, the jacket 11 and the enlarging device 31 become disconnected, and the jacket 11 is drawn out of the reproducing apparatus 30.

Figure 6B:
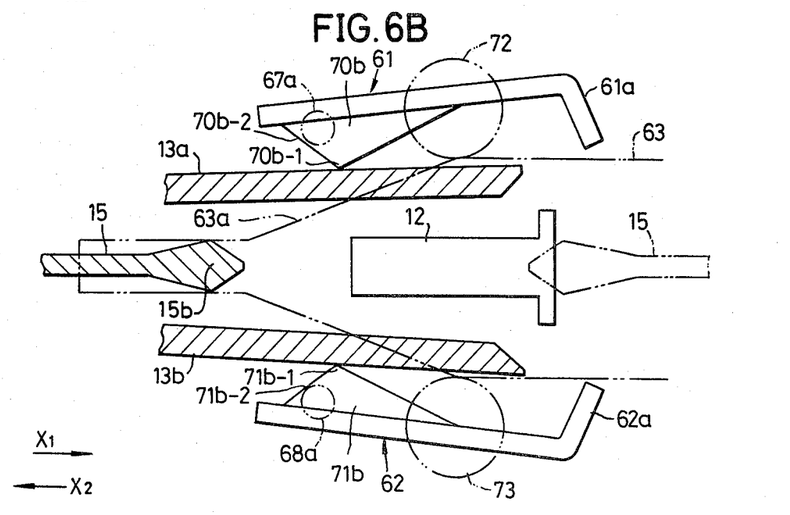
FIG. 6B is a diagram showing operational states of the projections shown in FIG. 6A upon enlarging of a jacket opening in a state where the enlargement is limited.

The jacket halves 13a and 13b of the jacket 11 are enlarged in the upward and downward directions by the enlarging device 31. However, at the positions P1 and P2, the jacket halves 13a and 13b respectively make contact with the projections 70a and 70b, and 71a and 71b, and the enlargement of the jacket is accordingly limited as shown in FIG. 6B.

Figure 8:
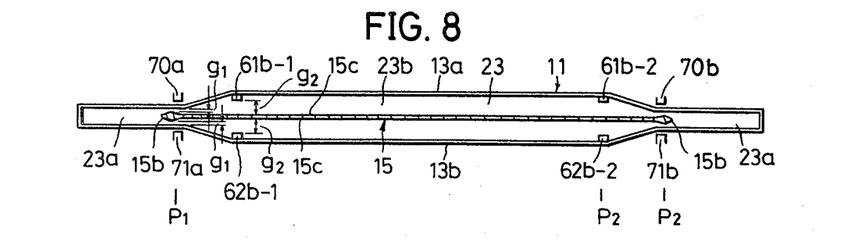
FIG. 8 is an elevation in cross section along a line VIII—VIII in FIG. 7, showing a state where a jacket opening is enlarged by the enlarging device shown in FIG. 3 with the enlargement limited with respect to right and left side parts of the jacket opening, together with a disc.

Therefore, as shown in FIG. 8, the jacket opening 23 is enlarged to form a wide part 23a at a section between the enlarging fingers 61b-1 and 62b-1, and 61b-2 and 62b-2. On the other hand, at parts to the outer sides of the projections 70a and 70b, and 71a and 71b, that is, at parts to the outer sides of the positions P1 and P2, the enlargement is limited and narrow parts 23b are formed. The shape of the jacket opening 23 in the enlarged state is stable due to the material, molding method, construction and the like of the jacket 11, and the shape shown in FIG. 8 is always obtained.

Accordingly, in the above disc supporting state where the positional relationship between the partially extracted jacket 11 and the disc 15 becomes as shown in FIG. 7, the positional relationship between the groove guard 15b of the disc 15 and the jacket opening 23 becomes as shown in FIG. 8. That is, at the jacket opening 23, the groove guard 15b opposes the narrow part 23a. A gap g1 formed between the groove guard 15b and the inner surfaces of the jacket halves 13a and 13b, becomes considerably smaller than the gap formed conventionally. Therefore, the groove guard 15b will hit against the inner surfaces of the jacket halves 13a and 13b, to prevent excessive movement of the disc 15 towards the upward and downward directions. However, a distance g2 between the enlarging fingers 61b-1 and 61b-2, and 62b-1 and 62b-2 is large as in the conventional case, and the enlarging fingers 61b-1 and 62b-1 (62b-2 and 62b-2) are relatively separated from a recording surface 15c of the disc 15.

Hence, even in a case where the jacket 11 is pulled out or extracted in an exceedingly fast manner and the disc lifter 90 intensely hits against the disc 15, the bouncing of the disc 15 is effectively limited by the jacket 11. Moreover, the recording surface 15c of the disc 15 is prevented from being damaged due to contact with the enlarging fingers 61b-1 and 62b-1 (61b-2 and 62b-2), because the enlarging fingers 61b-1 and 62b-1 (61b-2 and 62b-2) are relatively separated from the recording surface 15c.

In addition, upon recovery of the disc 15, the wide part 23b of the opening 23 of the jacket 11 receives the disc 15 within the reproducing apparatus. Therefore, the disc 15 can smoothly and relatively enter into the jacket 11.

Further, the present invention is not limited to these embodiments, but various variations and modifications may be made without departing from the scope of the present invention.

What is claimed is:

1. An apparatus for reproducing a rotary recording medium accommodated within a case, said case comprising a jacket having a space for accommodating the rotary recording medium therein and an opening through which said rotary recording medium can enter and leave said jacket, and a lid member inserted through said opening of the jacket for covering and closing the opening, said reproducing apparatus comprising:

an inserting opening through which the case is inserted;

clamping means disposed in at an innermost part of the reproducing apparatus, for clamping the rotary recording medium when the case is inserted into the reproducing apparatus and then the jacket is pulled out of the reproducing apparatus to leave the rotary recording medium within the reproducing apparatus;

a turntable for rotating the rotary recording medium thus left within the reproducing apparatus;

a jacket opening enlarging device provided in the vicinity of said inserting opening, and movable between a position in the vicinity of said inserting opening and said innermost part of the reproducing apparatus by passing over said turntable, for enlarging said jacket opening upwards and downwards so as to mutually separate an upper plate and a lower plate of said jacket inserted into the reproducing apparatus through said inserting opening upwards and downwards; and a jacket opening enlargement limiting mechanism provided to oppose parts in the vicinity of the right and left ends of said jacket inserted into the reproducing apparatus through said inserting opening, for receiving said upper and lower plates mutually separated upwards and downwards by said jacket opening enlarging device and limiting the displacement in the upward and downward directions, said jacket opening being enlarged in a state where the enlargement is limited at the parts in the vicinity of the right and left ends thereof.

2. A reproducing apparatus as claimed in claim 1 further comprising a support mechanism rising as said jacket is pulled out of said reproducing apparatus, for supporting said rotary recording medium clamped by said clamping means, and said jacket opening enlargement limiting mechanism is arranged and provided so as to oppose an outer groove guard of said rotary recording medium at a position of said jacket opening when said support mechanism supports said rotary recording medium.

3. A reproducing apparatus as claimed in claim 1 in which said jacket opening enlarging device comprises an upper enlarging member laterally provided at the upper side of said inserting opening, a part of said upper enlarging member on the side of said inserting opening being axially supported, said upper enlarging member having a downward inclination towards the innermost part of said reproducing apparatus so that a tip end of said upper enlarging member is raised upon enlargement of said jacket opening, and a lower enlarging member laterally provided at the lower side of said inserting opening, a part of said lower enlarging member on the side of said inserting opening being axially supported, said lower enlarging member having an upward inclination towards the innermost part of said reproducing apparatus so that a tip end of said lower enlarging member is lowered upon enlargement of said jacket opening; and said jacket opening enlargement limiting mechanism comprises upper projections projecting from the lower surface of said upper enlarging member, and lower projections projecting from the upper surface of said lower enlarging member, said upper and lower projections being arranged along an inserting direction of said case into said reproducing apparatus, at the axially supported sides of said upper and lower enlarging members, to oppose each other.

4. A reproducing apparatus as claimed in claim 3 in which said upper projection has a sloping surface at the side of said inserting opening, sloping downwards towards the innermost part of said reproducing apparatus, and said lower projection has a sloping surface at the side of said inserting opening, sloping upwards towards the innermost part of said reproducing apparatus.

5. A reproducing apparatus as claimed in claim 3 in which said upper and lower projections respectively have a cross section of a substantially triangular shape.

6. A reproducing apparatus as claimed in claim 3 in which said upper and lower projections respectively are formed unitarily with said upper and lower enlarging members.

* * * * *